J. M. Swift,
Automatic Gate,
N°. 68,804.
Patented Sep. 10, 1867.
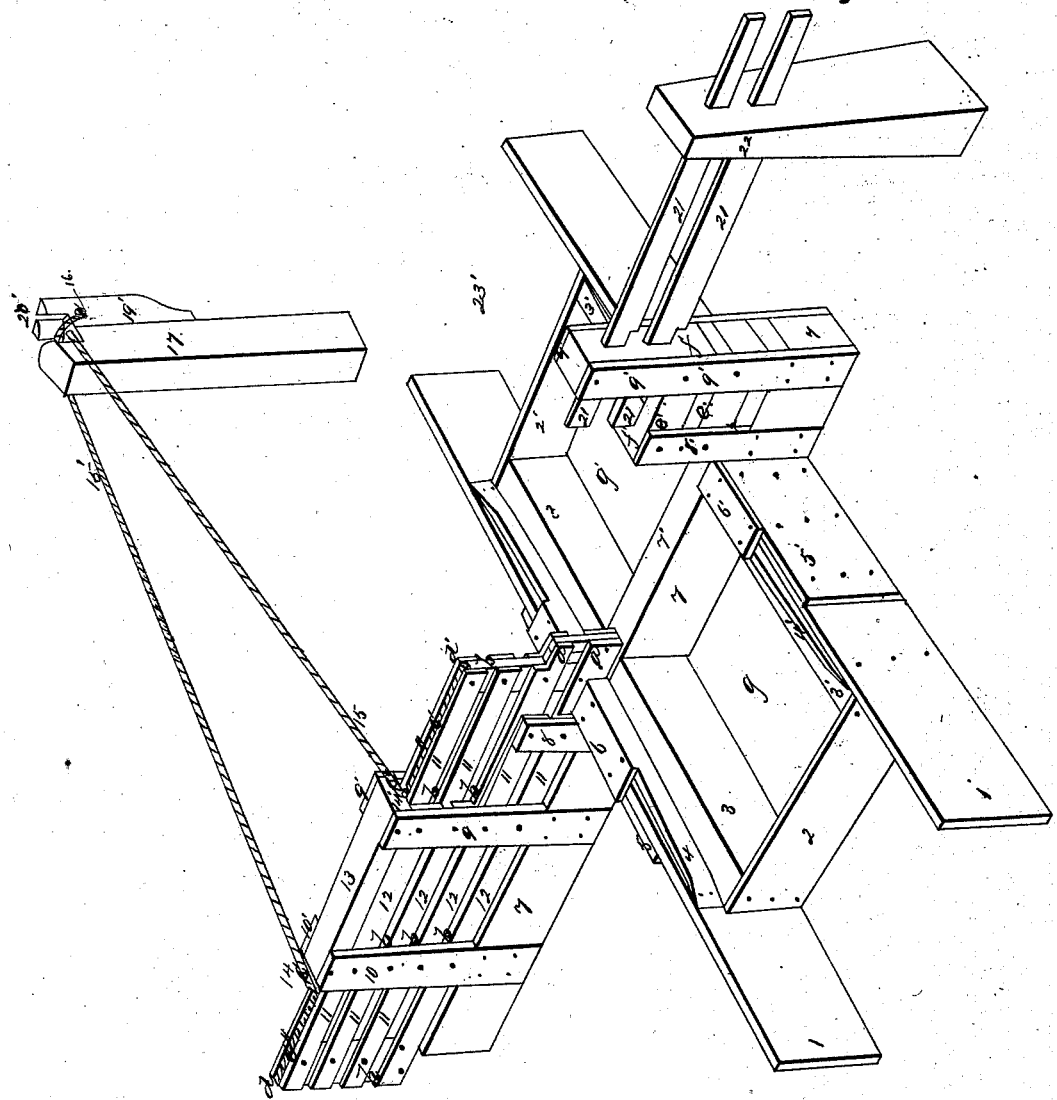
Witnesses,
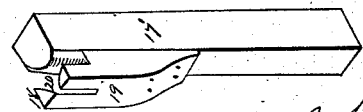
Inventor
John M. Swift

United States Patent Office.

JOHN M. SWIFT, OF SHELBYVILLE, ILLINOIS.

Letters Patent No. 68,804, dated September 10, 1867.

IMPROVEMENT IN GATES.

*The Schedule referred to in these Letters Patent and making part of the same.*

TO WHOM IT MAY CONCERN:

Be it known that I, JOHN M. SWIFT, of Shelbyville, Shelby county, Illinois, have invented a new and useful Slide and Pass-Over Gate; and I hereby declare that the following is a full and exact description thereof, reference being had to accompanying drawings, and to the letters and figures of reference marked.

The nature of my invention consists in a combined system of sills and tie-blocks and posts, boards, guides, slide, and channel-bed, and eyelets, cord, and fastenings. The improvement consists in its adaptation to the surface of the ground on which it is placed. It has no posts inserted in the earth, and can therefore be removed from field to field at pleasure, escaping the sag or lean of other gates and posts by frosts and rain; is always in position for use without care or repair; further, in the filling and confining ground, saw-dust, or other material, between the bed-pieces of the gate, lifting horses and carriages twelve inches above the surrounding surface, thus removing the inconvenience of a muddy gate-way; further, in the cord arrangement, by which the driver, remaining in his carriage, can open, shut, and fasten the gate; further, in the bulk arrangements, by which several feet of space is obtained for the passage of bulky loads, like hay or grain, the extra width of the load passing over the fence on either side removing the necessity of using a wide gate-way at all times when only occasionally extra width is required. The character of the structure requires a light, thin, one-hand slide, resting on its whole lower edge, thus removing the necessity of using a heavy-leaning, unwieldy gate, all constructed at small cost.

To enable the examiner to understand this invention, let us give the names and numbers of its parts, what relation they bear to each other, and the manner in which the invention works.

Let N be north in the supposed road upon which the gate is to be placed, and S south. 1 1' are the road-boards, between which the earth is to be raised, with ground or other substance, as high as the upper edge of 2 2', which we will call ground-boards. The space $g$ $g'$ is to be filled with similar substances. 3 3' we will call bed-pieces, upon which the wheels of the carriage are to run. 4 4 are wheel-guides, which keep the ends of the axle-trees or hubs inside of the posts. 5 5' and 6 6' are called the upper and lower slide-guides, which control and direct the slide, or gate proper, which will be more fully described. 7 7 7' is the cross-tie, which holds the whole structure together, and upon which (7') the slide moves backward and forward, as may be desired. 8 8', short bulk-posts, to which the slide need only be drawn when small loads or loads of small bulk are passing. 9 9 9 9' are large bulk-posts, to which the slide should be drawn and 21 21 slipped back to 9' 9', as will be explained, to allow bulky loads to pass. 10 10' are channel-posts, between which the slide moves. 11 11 are the boards or the bars framed together upon slide-frame $h$ $h$, composing the slide proper. 12 12 12 are boards, making a double section of fence when the gate is shut, also helping as guides to the slide. 13 is the cord-block, into either end of which are fastened the eyelets 14 14' through which the cord 15 15' passes. C C is a cord-bed between and upon the top of bars 11 11, but partially sinking between the upper parts of said bars to a strip or plate nailed between the north and south bars, forming a bed for the cord 15 15'. 15 15 is the cord, one end of which passes through the west eyelet, and is attached to the east slide-pin; the other end passes through east eyelet, and is attached to the west slide-pin, and when drawn causes the slide to open or close, and is carried by the driver through the space, and is placed on the opposite road-post. 14 14 are the eyelets through which the cord 15 passes, and by means of which the slide is opened or closed. $d$ $d'$ are the pins which fasten the ends of the cord 15 15'. 16 is a knot behind a tie on cord 15 15, by which the gate is held in its place by dropping it behind the slit 20 20'. 17 17' are the road posts, upon which the cord 15 is to be dropped when used, and which may be placed at a convenient distance from the track. 18 18 are triangle points, made by slit 20 20' in tie-blocks 19 19', which are fastened upon the road-posts, by the use of which the slide may be held by 15, as stated. 20 20' are slits in tie-block to hold the cord by knot 16. 21 21 are fence-boards, which may be slipped back in 9' and 22, where bulky loads are to pass, or when footmen desire to pass. Over from upper slide-guides 6', beyond 22, is a fence-post. $a$ $a$ is a section of the slide corresponding with an orifice in bulk-post 8', into which it slips, so as to prevent swine from lifting the slide. $b$ $b$ is a channel between the posts 9 9' and 10 10', in which the slide runs. $E$ $f$ $E$ $f$ are blocks between the short and long bulk-posts on the east side, by which the slide is held down. This description is for one side of the invention, but each side is alike and has the same parts, and should be so considered in the combinations for which I claim patent.

What I claim as my invention, and desire to secure Letters Patent for, is—

1. A combination of road-boards 1 1', cross-tie 7, bed-pieces 3 3, wheel-guides 5 5', 6 6', ground-boards 2 2', which I have called pass-over combination.

2. A combination of the slide 11 11, the posts 8, 9, and 10, the upper and lower channel-guide boards, the channel in which the slide moves, and the upper surface of the cross-tie 7, which I have called the slide and channel combination.

3. A combination of the two short and two long bulk-posts with the two sliding-bars 21 21 and the blocks E $f$ E $f$, which form the orifice for end of slide, which I have called the bulk combination.

4. I claim the combination of the cord 15, the tie-knots 16, the cord-bed C C, the cord-pins $d$ $d'$, the cord-block 13, the two eyelets 14 14, the ground-posts 17 17', the tie-blocks, with the slips 20 20'

5. I claim and desire Letters Patent for the gate, combined and constructed as set forth in the specification, description, and drawing.

JOHN M. SWIFT.

Witnesses:
  GEO. D. CHAFEE,
  CHAS. BENNETT.